United States Patent [19]

Frazita

[11] Patent Number: 4,520,361
[45] Date of Patent: May 28, 1985

[54] CALIBRATION OF A SYSTEM HAVING PLURAL SIGNAL-CARRYING CHANNELS

[75] Inventor: Richard F. Frazita, St. James, N.Y.

[73] Assignee: Hazeltine Corporation, Commack, N.Y.

[21] Appl. No.: 497,348

[22] Filed: May 23, 1983

[51] Int. Cl.³ .......................... G01R 17/04; G01S 7/40
[52] U.S. Cl. .................................... 343/372; 343/17.7
[58] Field of Search ................. 367/13; 343/17.7, 368, 343/771, 372, 351, 360; 324/58 A, 84, 83 A, 83 R; 328/155

[56] References Cited

U.S. PATENT DOCUMENTS

| | | | |
|---|---|---|---|
| 3,471,855 | 10/1969 | Thompson | 343/17.7 |
| 3,646,558 | 2/1972 | Campanella | 343/372 X |
| 3,883,870 | 5/1975 | Kunz | 343/17.7 |
| 4,060,806 | 11/1977 | Davies et al. | 343/17.7 |
| 4,176,354 | 11/1979 | Hsiao et al. | 343/17.7 |
| 4,348,676 | 9/1982 | Tom | 343/17.7 |
| 4,394,659 | 7/1983 | Gellekink | 343/17.7 X |

Primary Examiner—Theodore M. Blum
Assistant Examiner—Gilberto Barrón, Jr.
Attorney, Agent, or Firm—E. A. Onders; F. R. Agovino

[57] ABSTRACT

In a system having plural signal-carrying channels, a phase shift is introduced between a signal in one of the channels and a reference signal for calibrating the individual channels. The phase shift is introduced by phase-shift apparatus responsive to a command signal directing the continuous monotonic increment of phase. The apparatus may be contained within each channel for use in the signal-carrying process, or may be placed in the reference channel for use solely in the calibration process. The phase incrementing introduces a frequency shift (a serrodyning) which produces a beat-frequency signal upon mixing a channel signal with a reference signal. The beat-frequency signal is phase locked to a modulation pattern of the command signal whereby a measurement of phase (or delay) can be made between the two signals for calibration of each channel within the system.

26 Claims, 4 Drawing Figures

CALIBRATION OF A SYSTEM HAVING PLURAL SIGNAL-CARRYING CHANNELS

BACKGROUND OF THE INVENTION

This invention relates to systems having plural signal-carrying channels, such as scanning arrays, and, more particularly, to a method and apparatus for fault testing of components in and for measuring and adjusting starting phase of the array prior to a scan to form a focused beam.

Plural channel systems are often constructed with numerous signal-carrying channels arranged in parallel. Examples of such systems are found in electrical communication, including telemetry in which different messages are transmitted along parallel channels, apparatus for sound amplification and recording wherein a signal is divided among separate spectral passbands for correction of a loudness characteristic, and array antennas wherein multiple channels provide various time delays and/or phase shifts for steering a beam of radiation.

In any of the foregoing plural channel systems, optimum operation of the system is obtained when the design characteristics of the respective channels are maintained. Such characteristics may include preset time delays, preset phase shifts, and preset amplification factors for signals propagating through the channels. A calibration process and equipment are utilized to provide optimum operation.

One area of considerable interest occurs in a microwave landing system (MLS) utilized for guiding aircraft to a landing on an airport runway. An array antenna is advantageously employed in an MLS for forming a glide slope beam or a localizer beam. The direction and the pattern of the beam are dependent on the phase shifts (and possibly on amplitude shading factors) applied to radiators of the array by individual signal-carrying channels coupled to respective ones of the radiators. MLS phase calibration is employed to measure the insertion phase of each channel of an MLS array. The calibration information is used to adjust the starting phase of each element in the array to compensate for the insertion phase errors resulting from manufacturing processes, tolerances and component aging. Proper MLS phase calibration results in a well-focused beam with low side lobes and should be performed periodically to correct aging effects. Calibration of the array antenna is important to insure that the beam is properly formed and correctly directed for a safe landing by the aircraft.

A problem arises in that the calibration of the foregoing systems has entailed overly complex equipment and time consuming processes. For example, in the case of a phased array antenna, such processes have employed the injection of test signals followed by the measurement of in-phase and quadrature components utilizing complex algorithms in computers. This problem is due, in part, to the difficulty of measuring one channel without being "swamped" by all other channels in the array.

SUMMARY OF THE INVENTION

The foregoing problem is overcome and other advantages are provided by a calibration method and apparatus incorporating the invention for calibrating a system having plural signal-carrying channels. While the invention is ideally suited for numerous types of systems, a preferred embodiment of the invention will be demonstrated for calibration of a phased-array antenna of the form used in a microwave landing system. The physical structures of the components utilized in construction of the invention are such as to permit their coupling to the phased-array antenna with a minimal addition to the complexity of the structure of the antenna itself. Also, the electronic circuitry of the invention is separate from the circuitry which operates the MLS.

The circuitry and process for implementing the invention for the phased-array antenna of the MLS is as follows. The individual radiators of the antenna are energized by separate signal-carrying channels, each of which includes a phase shifter, the phase-shifters being coupled, in turn, via a power divider to a common transmitter. The phase-shifters are individually actuated by command signals supplied by a beam-steering unit wherein individual phase-shifts are applied to the signals energizing the respective radiators for shaping and directing a resulting beam of radiation provided by the array of radiators. Each channel contains an energy-absorbing switch also individually actuated by the beam steering unit. As a result, the amplitude and phase of the output signal of each channel may be measured.

The invention is implemented by serrodyning the selected channel by extracting a small fraction of the transmitted signal to serve as a reference signal, and then continuously imparting incremental phase-shifts between the signal of a selected one of the channels and the reference signal. All the other channels are switched off to reduce their effect on the phase of the unserrodyned reference signal. The continuously incremented phase-shift results in a frequency offset between the signal of the selected channel and the reference, such a frequency offsetting by means of phase incrementing being referred to as serrodyning. A waveguide manifold is coupled to each of the radiators for extracting a small sample of the output signal of the selected channel. The sample of the output signal is mixed with the reference signal to produce a beat-frequency signal wherein the beat frequency is on the order of 3–4 KHz (kilohertz), while the frequencies of the output sample and of the reference signal are approximately 5 GHz (gigahertz).

The invention synchronizes the phase-shift imparted to the signal of the selected channel under test and the pattern of the phase increments of the command signal while simultaneously isolating the slected channel from all other channels. As a result, the zero-crossings of the beat-frequency signal bear a fixed time relationship from corresponding portions of the pattern of phase shifts of the command signal. The time of the zero crossing is measured for the signal of the selected channel, after which the process is repeated for each of the other channels. The resulting set of time measurements is a measure of the phase calibration of the respective channels.

Alternatively, rather than serrodyning the phase shifters of of the selected channel: (1) a separate phase shifter may be introduced in the path of the reference signal, the reference phase shifter then being serrodyned to produce the frequency offset and the beat frequency; or (2) instead of switching off the unselected channels, they can be serrodyned at a frequency that, when mixed with the reference frequency, falls outside the signal processing band.

The zero-crossing time-delay measurement serves as a measure of the insertion phase of a signal passing through a signal channel and into the radiator. The phase shift caused by each bit in the channel phase shifter can also be similarly measured by incrementing the starting phase of successive serrodyning patterns and measuring the shift of the zero-crossing of the beat frequency signal. It is also advantageous to compare the amplitudes of the respective output signal samples of the corresponding channel signals as to provide for a calibration in terms of amplitude variation. Such a calibration is useful in the event that amplitude shading is employed among the signals of the respective radiators for improved formation of the radiated beam pattern.

BRIEF DESCRIPTION OF THE DRAWINGS

The foregoing aspects and other features of the invention are explained in the following description taken in connection with the accompanying drawings wherein.

DESCRIPTION OF THE PREFERRED EMBODIMENT

Figure 1:
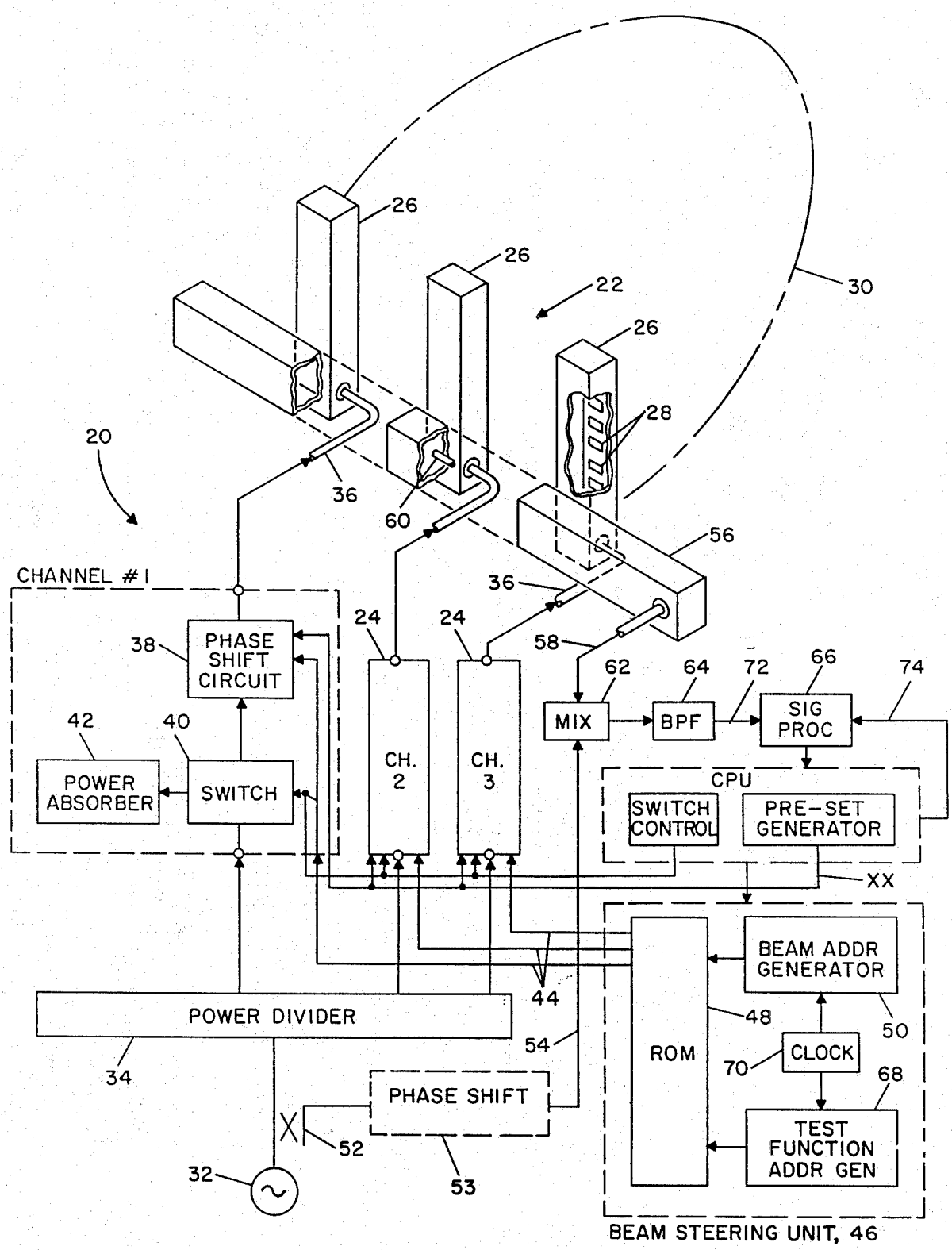
FIG. 1 is a view of a phased-array antenna for an MLS coupled to a multiple-channel phase-shifter circuit including circuitry of the invention, the view being partially stylized and partially in block diagrammatic form.

With reference to FIG. 1, there is shown a portion of a microwave landing system 20 comprising a phased-array antenna 22 and a set of signal-carrying channels 24 for applying signals to individual radiators 26 of the antenna 22. While the antenna 22 may comprise many radiators 26, only three of these radiators have been shown to simplify the drawing. Each of the radiators 26 is in the form of a slotted waveguide, an exemplary slot 28 being in a cutaway portion of one of the radiators 26. The set of radiators 26, when energized with their respective signals from the channels 24, provides a beam 30 suitable for the guidance of aircraft (not shown).

The channels 24 are fed by a signal generated by a transmitter 32 and coupled to the input terminals of the channels 24 by a power divider 34. The output terminals of the channels 24 are coupled by coaxial cables 36 to respective ones of the radiators 26.

Each of the channels 24 comprises a phase-shifting circuit 38, a switch 40 and a power absorber 42. Each of the channels 24 is coupled via a line 44 to a beam-steering unit 46 from which command signals are applied, via the line 44, to the phase-shifting circuit 38 and the switch 40 in the channel 24.

The beam-steering unit 46, illustrated in simplified block diagram form herein is of conventional, well-known design and includes a read-only memory (ROM) 48 and an address generator 50 which addresses ROM 48 to provide the appropriate set of increment command signals on the lines 44 for establishing a specific movement of the beam 30. The initial specific direction of the beam is established by preset command signals on lines xx generated by the system central processing unit CPU. Together, the command signals operate the phase-shifting circuit 38 in the channels 24 for imparting phase-shifts to the signal of the transmitter 32 whereby the beam 30 is oriented in a specific direction and scanned in a certain fixed time sequence. If desired, the channels 24 may include circuitry (not shown) such as amplifiers and well-known gain-control circuits to provide an amplitude shading to the signals applied via the cables 36 to the respective radiators 26 for further definition of the pattern of the beam 30.

In accordance with the invention, the system 20 further includes a microwave coupler 52 for extracting a small fraction of the calibration signal of the transmitter 32 to provide a reference signal on line 54, and a waveguide manifold 56 which is coupled to each of the radiators 26 for extracting samples of the output signals of the respective channels 24, these output samples appearing on line 58. The manifold 56 is coupled to the back sides of the respective radiators 26, opposite the front sides containing the slots 28, the coupling being accomplished by apertures 60, one such aperture 60 being seen in a cut-away portion of the manifold 56. U.S. patent application Ser. No. 497,349 for a Resonant Waveguide Aperture Manifold invented by Alfred R. Lopez and U.S. patent application Ser. No. 497,350 for an Asymmetric Resonant Waveguide Aperture Manifold invented by Richard F. Frazita and filed concurrently herewith are incorporated herein by reference. Both applications are assigned to Hazeltine Corporation and illustrate the embodiments of manifold 56. The fraction of the power coupled by one of the apertures 60 to manifold output 58 is a small fraction of the power transmitted by the radiator, less than 30 dB (decibles), so as to minimize any effect on the radiation of the electromagnetic energy from the antenna 22. The amount of power coupled by the coupler 52 to mixer 62 is also a small fraction of the power transmitted by the transmitter 32, preferably less than 30 dB, the signal power in the line 54 being 58 for operation of mixer 62.

The circuitry of the invention further includes the mixer 62, a band-pass filter 64, a signal processor 66 and an address generator 68 which provides test function addresses to the ROM 48. A clock 70 drives both address generators 50 and 68. The mixer 62 mixes the sample output test signal on line 58 with the reference sample on line 54 to provide a low frequency component of the mixing process, the low frequency component being separated from higher frequency components of the mixing process and of the discrete phase stepping of the serrodyning process by the filter 64. As will be explained in further detail subsequently, the generator 68 addresses the ROM 48 to provide a predetermined pattern of phase-shift commands which result in a serrodyning of the phase-shifting circuit 38 resulting in a beat-frequency signal appearing at the output terminal of the filter 64. The beat-frequency signal is applied by the filter 64 along line 72 to the signal processor 66, and a reference pattern signal of the phase command pattern is applied by the CPU via line 74 to the signal processor 66 to accomplish a measurement of time delay between the signals on the lines 72 and 74. The RF phase of the channel relative to the reference signal minus the fixed circuit/filter delay equals the difference between the beat frequency and the predetermined pattern.

Figure 2:
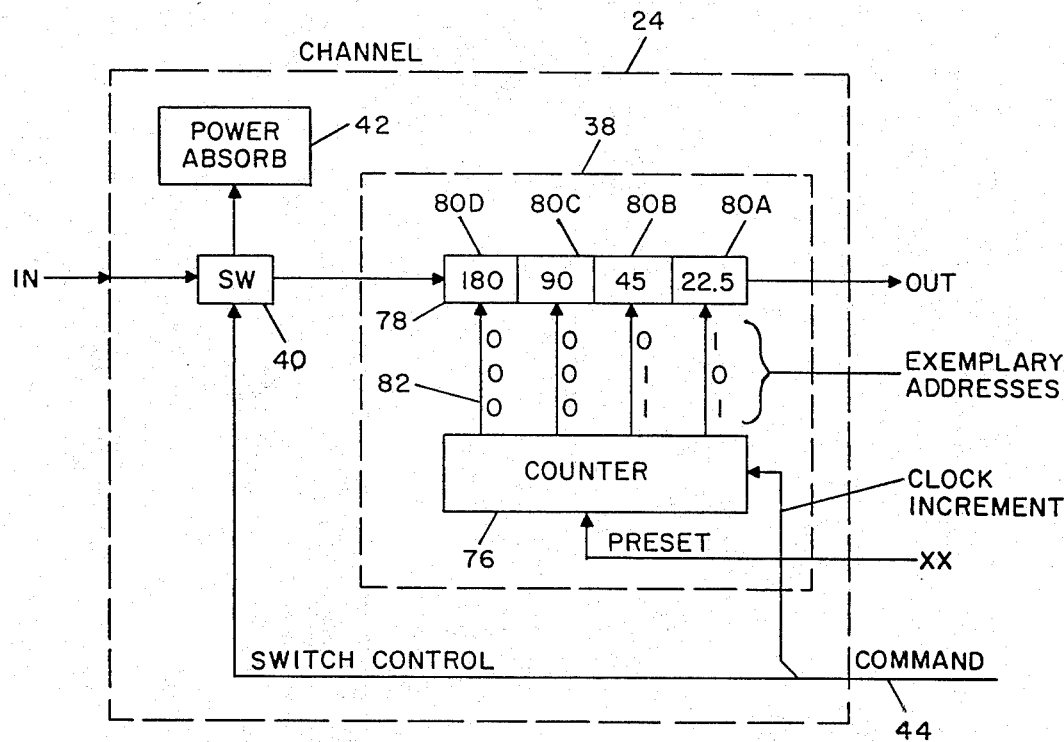
FIG. 2 is a block diagram of a phase-shifter assembly of one of the channels of FIG. 1.

With reference also the FIG. 2 there is provided a more detailed view of the channels 24 and the phase-shifting circuit 38 therein. The phase-shifting circuit 38 includes a counter 76 and an assembly 78 of phase-shifters 80, individuals ones of the phase-shifters 80 being further identified by the legends A-D when it is desired to identify specific ones of the phase-shifters 80. The phase-shifters 80 are serially connected and are addressed by output lines of the counter 76. Each phase-shifter 80 is fabricated of a well-known diode circuit or ferrite circuit. By way of example, such a diode circuit (not shown) would comprise a set of stub-tuned transmission lines which are shorted upon activation of diodes to change the electrical length of the stub transmission lines. Thereby, there are two phase-shifter states, namely, zero phase-shift when the diodes are de-energized, and a fixed value of phase-shift such as 45°, or 90°, upon energization of the diodes.

Each of the phase-shifters 80 operates independently of the other phase-shifters 80 and, accordingly, can be arranged in the serial combination of the assembly 78 wherein a phase-shifter is added to a phase increment provided by another of the phase-shifters 80. For example, a phase-shift of 135° is obtained by activating the phase-shifters 80B and 80C while the phase-shifters 80A and 80D are deactivated. The coupling of output lines 82 of the counter 76 is arranged such that the least significant bits being coupled, respectively, to the phase-shifters 80D-B. Exemplary output counts of the counter 76 are shown adjacent the line 82 whereby the individual digits of the count serve as addresses to the phase-shifters 80.

In accordance with a feature of the invention, the foregoing connection of the output lines to the respective phase-shifters 80 corresponding to the significance of the respective digits facilitates both the serrodyning and the calibration mode of the system 20 as well as the selecting of phase for directing the beam 30 during use of the antenna 22 for guiding aircraft. The command signals consist of clock pulse signals on line 44 which are applied to the counter 76 and preset signals on line xx. Thus, in the operation of the phase-shifting circuit 38 for forming the beam 30, the counter 76 is preset by the system CPU to an initial value after which the clock pulses are applied to advance the counter to address the requisite amount of phase-shift from the assembly 78 of the phase-shifters 80. In the exemplary circuit of FIG. 2 wherein the assembly 78 is shown as comprising four phase-shifters 80, the counter 76 recycles after reaching a count 16.

In the calibration mode the starting phase of the array is measured and adjusted prior to scan to form a focused beam. In particular, the counter 76 is similarly preset to a specific value, after which the clock pulse signals are applied continuously to the counter 76 resulting in a counting modulo-16 with the phase-shift increases in increments of 22.5° through 360° at which point the assembly 78 of the phase-shifters produces a phase-shift of 0°. The incrementing of phase-shift continues modulo 360° during the calibration mode as long as the clock pulses are applied via line 44 to the counter 76.

During normal operation of the antenna 22 for the guiding of aircraft, the switch 40 actuated by command signals which form a path on lines xx couples power from the power divider 34 to the assembly 78 of the phase-shifters 80. Such coupling of power occurs in each of the channels 24. However, during the calibration mode, the coupling of power from the power divider 34 to the phase-shifters 80 occurs only in a selected one of the channels 24. In the other channels, the switch 40 is operated to divert the power to the power absorber 42 by command by the CPU. Thereby, in each of the channels 24 wherein the diversion to the power absorber 42 occurs, there is essentially no power being transmitted via the output terminal of the channel 24 to the corresponding one of the radiators 26. In FIG. 2, the control line 44 carrying a signal to operate the switch 40 is seen to split into a switch control signal and a clock increment signal. Thereby, in accordance with signals applied via the address generators 50 and 68 to the ROM 48, the CPU applies command signals via the lines 44 to select a specific one of the channels 24 to be calibrated during the calibration mode, controlling the appropriate values of phase-shift through the BSU for forming the beam 30 during the guidance of aircraft.

Figure 3:
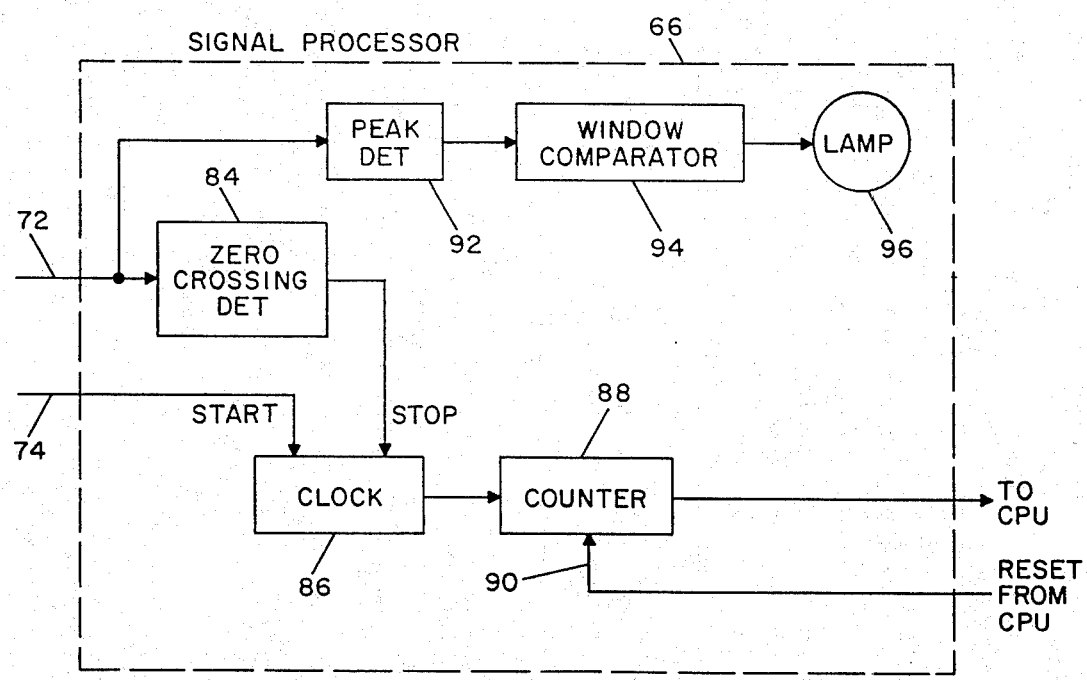
FIG. 3 is a block diagram of a signal processor of FIG. 1.

With reference also to FIG. 3, the signal processor 66 comprises a zero-crossing detector 84, a clock 86, a counter 88 with a reset 90, a peak detector 92, a window comparator 94 and an indicator, such as a lamp 96. In the presence of the serrodyning, the aforementioned frequency shift between the output sample on line 58 and the reference signal on line 54 results in a signal with a sinusiodal waveform on the line 72. The sinusiodal signal on line 72 is applied to the zero-crossing detector 84 which, upon the detection of a zero-crossing in the sinusoidal signals, produces an output pulse signal which stops the clock 86. The clock 86 is initially started by the reference pattern signal coupled thereto via line 74 from the CPU. The signal on line 74 serves as a phase reference from which the insertion phase of a channel 24 is to be measured. Thus, upon the resetting of the counter 76 of FIG. 2 by the ROM 48 and the generator 68, the generator 68 simultaneously sends the reference signal on line 74 to start the clock 86 in FIG. 3. The counter 88 then counts pulses of the clock 86. A stopping of the clock 86 upon the occurrence of the next zero-crossing of the signal on line 72 thereby provides a count on the counter 88 which is a measure of the signal-propagation delay i.e. relative insertion phase in a channel 24. The count of the counter 88 may be displayed on an indicator 98 and is used to preset each phase shifter. As a result, the preset generator of the CPU and counter 76 use the insertion phase measurement to form a focused beam with low sidelobes.

The signal on line 72 is also applied to the peak detector 92 which measures the maximum amplitude or peak value of the signal on line 72, and applies a signal to the window comparator 94. The comparator 94 measures the output signal of the detector 92 to determine whether or not the signal falls within a specific range of values that is preset within the comparator 94. In the event that the peak value of the signal on line 94 provides an output signal which lights the lamp 96 to indicate that the amplitude of the signal line 72 within an acceptable range of values. In the event that the signal on line 72 is too small, as might occur in the presence of a defective phase-shifter 80, then the lamp 96 remains dark. Thereby, the signal processor 66 provides an indication of the insertion phase of a channel 24, as well as an indication that the gain (or attenuation) of signals propagaing through a channel 24 is acceptable.

A further feature in the calibration process is provided by the magnitude of the reference signal on line 54 which, as has been noted hereinbefore, is many times larger than the magnitude of the output sample on line 58. Thus, during the calibration process, in the event that a switch 40 in one of the channels 24 is malfunctioning so that some power is being coupled to the absorber 42 while the balance of the power is being coupled through the phase-shifters 80, the calibration process can still continue. In the foregoing exemplary failure situation, two output samples would be present on the line 58, one output sample containing the serrodyne frequency shift. The other output sample is from the defective channel and has a frequency equal to that of the reference signal on line 54. Since the amplitude of the reference signal on line 54 is much greater than the sum of the two output samples, the mixer 62 continues to operate correctly. The combination of the unwanted output sample with the reference signal provides a dc component of the mixing operation which is blocked by the bandpass filter 64. Thus, only the beat frequency resulting from the mixing of the serrodyne signal with the reference signal appears on the line 72 with a very small error. Thereby, the calibration process for any one of the channels 24 can proceed in the event that another of channels 24 is defective. Consequently, the magnitude of the reference signal is also many times larger than the magnitude of the output signal of each of the unrotated channels. This avoids the introduction of phase-shift errors in the reference signal and is accomplished by switch 40 and absorber 42. Alternatively, the effects of other channels which are not rotated can be reduced by: (1) rotating the phase of the untested channels at a frequency which falls outside of the band pass of filter 64; or (2) in the embodiment of using a phase shifter 53 in the reference channel, each antenna channel being tested is also rotated in the opposite direction to generate the beat frequency.

Figure 4:
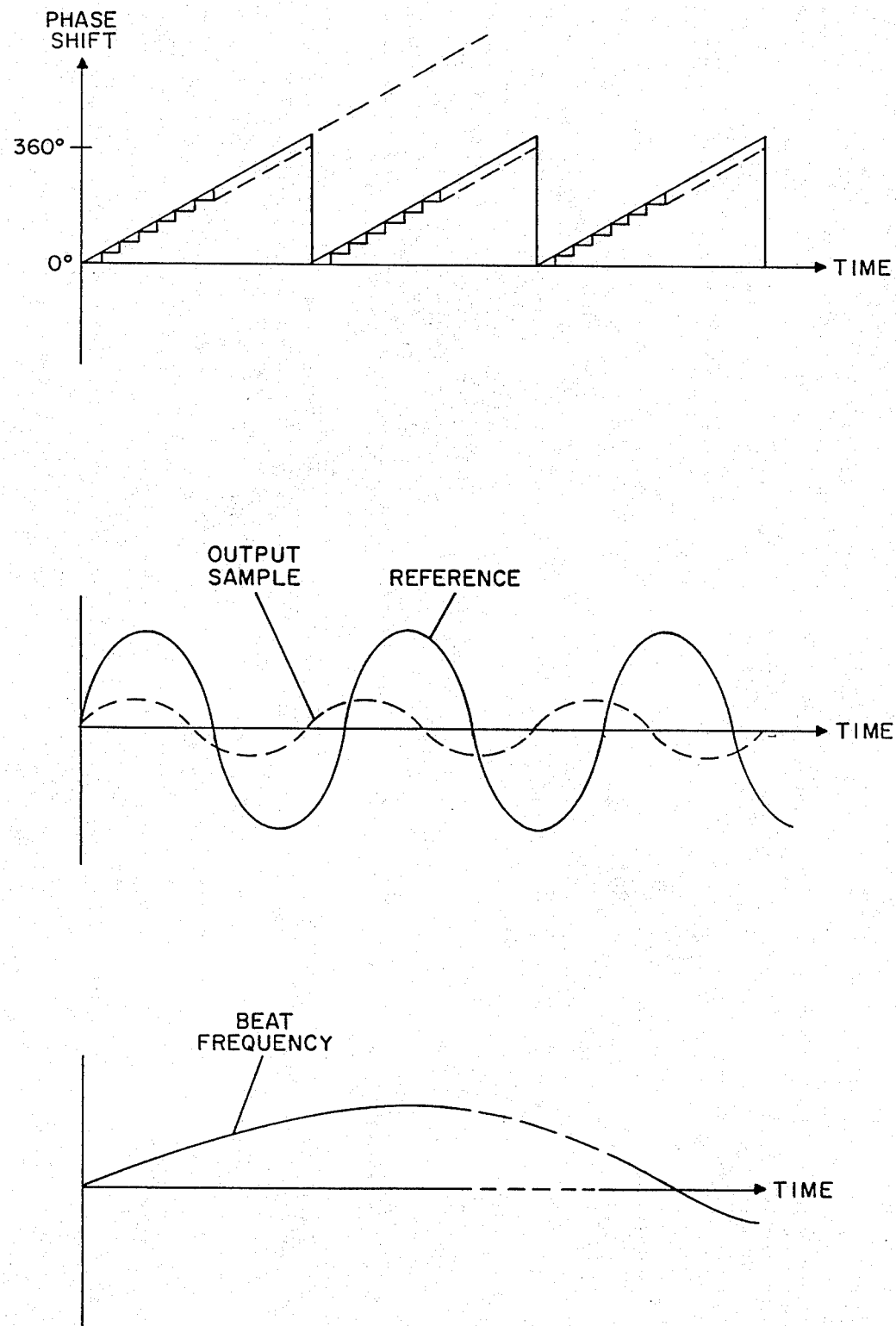
FIG. 4 shows a set of graphs useful in explaining the operation of the system of FIG. 1.

In operation, and with reference also to the graphs of FIG. 4, the system 20 provides for the forming of the beam 30 by the radiators 26 of the antenna 22, and for the orienting of the beam 30 in a desired direction relative to an airport runway. The selection of the proper values of phase-shift to accomplish the formation and direction of the beam 30 is accomplished by the addressing of the ROM 48 by the address generator 50, and the presetting and clocking of the counter 76. During the calibration mode, the switches 40 in all but the selected one of the channels 24 are operated to divert power of the power divider 34 from the antenna 22 to the power absorbers 42 in the respective ones of the channels 24. Thereby, the antenna 22 receives power only from the selected one of the channels 24 which is to be calibrated. Upon the conclusion of the calibraion of the selected one of the channels 24, a second one of the channels 24 is selected for calibration, this being followed by the calibration of successive ones of the channel 24, individually. During the calibration mode, the counter 76 is preset to address a specific value of phase from the assembly 78 of phase-shifters 80 to start the calibration beat-frequency signal on line 72. Also, at the start of the calibration beat-frequency signal, the reference signal on line 74 is applied to the signal processor 66 for starting the clock 86. The command signals on lines 44 during the calibration mode are provided by the action of the address generator 68 and the ROM 48; also, the reference signal on line 74 of the calibration mode is provided by the address generator 68.

As portrayed in the first graph of FIG. 4, the phase-shift applied by the phase-shifters 80 is implemented step-wise as a step-wise approximation to a continuously linear increase in phase. Since the phase-shift is applied modulo 360°, the graph takes the form of a saw-tooth waveform. The slope of the foregoing linear phase approximations with respect to time thus equal the beat frequency; the stepped increments are at a substantially higher frequency than the beat frequency and, accordingly, the steps are blocked by the filter 64 so that a smooth wave form appears on line 72.

In the second graph of FIG. 4, there is shown a portrayal of a reference waveform on line 54, the solid trace, and the output sample online 58, the dashed trace. The frequency shift between th two traces is exaggrerated so as to more readily portray the frequency shift due to the serrodyning. In the bottom graph of FIG. 4, the difference in frequency between the signals represented by the two traces is portrayed, this being the relatively low, beat frequency.

A particular feature in the generation of the beat-frequency signal be means of the sawtooth phase increment of the second graph, all of which is under control of the clock 70, is a phase lock between the reference signal of the address generator 68 on line 74 and the beat-frequency signal appearing on line 72. Thereby, the counting by the counter 88 in the signal processor 66 provides for an accurate measure of the insertion phase of each channel 24 during the calibration process.

By way of alternative embodiments of the invention, it is noted that further window comparators, such as the comparator 94, may be connected to the output terminal of the peak detector 92 of FIG. 3. Such additional window comparators 94 can be set for further ranges of values of signals provided by the channel 24 in the event that the amplitude shading of the respective channels is to be utilized for a more accurate formation of the beam 30. An additional lamp, such as lamp 96 would be coupled to each of the additional comparators to indicate that the scale factors, or gain of the respective ones of the channels 24, are correct for providing the requisite shading. Thereby, the invention provides for the implementation of a calibration process within a system having multiple signal-carrying channels with the use of no more than a minimum amount of additional curcuitry, and without introducing any more than a minimal amount of complexity to the physical structure of the system.

For a better understanding of the present invention, together with other and further objects, reference is made to the following description, taken in conjunction with the accompanying drawings, and its scope will be pointed out in the appended claims.

It is to be understood that the above described embodiments of the invention are illustrative only and that modifications thereof may occur to those skilled in the art. Accordingly, this invention is not to be regarded as limited to the embodiments disclosed herein, but is to be limited only as defined by the appended claims.

What is claimed is:

1. A method for calibrating phase-shifts in a system having multiple signal-carrying channels comprising the steps of:

terminating the propagation of signals in each of the channels except for a selected channel which is to be calibrated;

inserting a test signal into a first end of said selected channel;

extracting a portion of said test signal prior to said inserting for use as a reference signal;

imparting a variable phase-shift between said reference signal and said test signal by phase-shifting apparatus responsive to a command signal, said command signal directing a monotonic continuing pattern of phase variation, the resulting variation in phase producing a frequency shift between said test signal and said reference signal;

sampling said test signal after processing through the selected channel via a second end of said selected channel;

combining the sampled test signal with the reference signal to obtain a beat frequency signal;

measuring the phase-shift between said beat frequency signal and a reference pattern signal; and adjusting the starting phase-shift of the selected channel in response to the measured phase-shift.

2. A method according to claim 1 further comprising the step of comparing the amplitude of said beat-frequency signal with a predetermined value.

3. A method according to claim 1 wherein said step of imparting a variable phase-shift includes the step of locking the phase of said beat-frequency signal to said reference pattern signal.

4. A method according to claim 1 wherein said step of measuring the phase shift comprises the step of measuring of time elapsed between a reference point of said reference pattern signal and a reference point of said beat-frequency signal.

5. Apparatus for calibrating phase-shift in the channels of a system having multiple signal-carrying channels comprising:

means for supplying a calibration signal;

means for applying the calibration signal as a test signal to an input of a selected one of said channels;

means for extracting a portion of said test signal for use as a reference signal;

means for introducing a monotonically increasing phase-shift, in accordance with a predetermined pattern of phase-shift, between said test signal and said reference signal resulting in a frequency shift between test signal and said reference signal;

means for sampling an output produced by said selected channel for use as a sample output test signal;

means for mixing said reference signal with said sample output test signal to produce a beat frequency signal;

means for measuring an elapsed time between a reference pattern signal and said beat frequency signals; and means for adjusting the starting phase-shift of the selected channel in response to the elapsed time.

6. Apparatus according to claim 5 wherein said phase-shift introducing means includes a phase shifter within said selected channel.

7. Apparatus according to claim 6 further including means for controlling said phase-shifter, said means responsive to a command signal designating a succession of values of phase-shift for serrodyning said phase-shifter.

8. Apparatus according to claim 7 further including means for directing a predetermined amount of phase-shift for operation of said system at times other than during a calibration of said system channels.

9. Apparatus according to claim 8 wherein each of said channels includes a phase shifter and switch responsive to a command signal, the switches in the respective channels being used for selecting a channel to be calibrated.

10. Apparatus according to claim 9 wherein each of said channels further comprises a power absorber, said power absorber being coupled to said switch in each of said channels to provide a diversion of said test signal away from the output terminal of a channel during calibration of another one of said channels.

11. Apparatus according to claim 10 wherein said measuring means further includes means responsive to the amplitude of said beat-frequency signal to indicate the presence of the amplitude within a predetermined range of amplitude.

12. Apparatus according to claim 5 wherein said measuring means further includes means responsive to the amplitude of said beat-frequency signal to indicate the presence of an amplitude within a predetermined range of amplitude.

13. Apparatus according to claim 5 wherein said phase-shift introducing means includes a phase-shifter coupled along the path of said test signal between said extracting means and said mixing means for imparting a phase-shift to said test signal.

14. Apparatus according to claim 13 further including means for controlling said phase-shifter, said means responsive to a command signal designating a succession of values of phase-shift for serrodyning said phase-shifter.

15. Apparatus according to claim 14 wherein each of said channels includes a phase shifter and a switch responsive to a command signal, the switches in the respective channels being used for selecting a channel to be calibrated.

16. Apparatus according to claim 15 wherein each of said channels further comprises a power absorber, said power absorber being coupled to said switch in each of said channels to provide for diversion of said test signal away from the output terminal of a channel during calibration of another one of said channels.

17. Apparatus according to claim 16 wherein said measuring means further includes means responsive to the amplitude of said beat-frequency signal to indicate the presence of an amplitude within a pre-determined range of amplitude.

18. Apparatus according to claim 5 wherein said system includes a phased-array antenna having a set of radiators, respective ones of said radiators being coupled to output terminals of respective ones of said channels, said system further comprising a manifold coupled to said radiators for obtaining an output sample of said test signal from said one channel.

19. Apparatus according to claim 18 wherein said phase-shift introducing means includes a phase-shifter within said one channel, said phase shifter being responsive to a command signal designating a succession of value of phase shift for serrodyning said phase shifter, and wherein said command signal directs a predetermined amount of phase for operation of said system at times other than during the calibration of said system channels.

20. Apparatus according to claim 19 wherein each of said channels includes a phase shifter and a switch responsive to a command signal, and a power absorber coupled to said switch to permit diversion of a test signal away from an output terminal of a channel during calibration of another one of said channels; and wherein said measuring means further includes means responsive to the amplitude of said beat-frequency signal to indicate the presence of an amplitude within a predetermined range of amplitude.

21. Apparatus according to claim 18 wherein said phase-shift introducing means includes a phase shifter coupled between said extracting means and said mixing means for imparting a phase shift to said reference signal, said phase shifter being responsive to a command signal designating a succession of value of phase shift for serrodyning of said phase shifter; and wherein each of said channels further includes a phase shifter and a switch responsive to a command signal, the switches in the respective channels being used for selecting a channel to be calibrated.

22. The method of claim 1 wherein said step of imparting comprises phase shifting said test signal by the phase-shifting apparatus.

23. The method of claim 1 wherein said step of imparting comprises phase shifting said reference signal by the phase-shifting apparatus.

24. Apparatus according to claim 5 wherein said phase-shift introducing means includes a phase shifter coupled between said supplying means and said mixing means for imparting a phase shift to said reference signal.

25. The method of claim 1 wherein the step of sampling comprises sampling the signal radiated by the selected channel after said test signal is processed through the selected channel via a radiating element of said selected channel.

26. The apparatus of claim 5 wherein said means for sampling comprises means for sampling the signal radiated by the selected channel after said test signal is processed through the selected channel via a radiating element of said selected channel.

* * * * *